Sept. 6, 1949. P. T. WOODLAND 2,481,462
HARVESTER FOR SUGAR CANE OR THE LIKE
Filed April 11, 1947 2 Sheets-Sheet 1

INVENTOR
P. T. WOODLAND
By: Fetherstonhaugh & G.
ATT'YS

Sept. 6, 1949.   P. T. WOODLAND   2,481,462
HARVESTER FOR SUGAR CANE OR THE LIKE
Filed April 11, 1947   2 Sheets-Sheet 2

INVENTOR
P.T. WOODLAND
By: Fetherstonhaugh &c.
ATT'YS

Patented Sept. 6, 1949

2,481,462

UNITED STATES PATENT OFFICE 2,481,462

HARVESTER FOR SUGAR CANE OR THE LIKE

Percy Tyler Woodland, Swalwell, Alberta, Canada

Application April 11, 1947, Serial No. 740,741

4 Claims. (Cl. 56—17)

This invention relates to a harvester for sugar cane or the like of the class which is designed to engage the cane, remove the dried leaves or trash therefrom, selectively top it, cut it and deposit it in bunches.

Harvesters of this general class have been provided in the past. The ones known to me, however, have been quite unsatisfactory in use. In them the topping mechanism was usually mounted above the stripping mechanism and it was found that the leaves became tangled with the cane and prevented accurate topping. Moreover, they did not provide a positive enough means for forcing the stalks against the topping blades. I have invented a harvester which overcomes these disadvantages and which further has other substantial advantages over the machines of the prior art.

It is, therefore, an object of this invention to provide a harvester which will efficiently remove the trash from cane while it is in a standing position, and in such a manner that the trash does not become tangled in the cane.

It is a further object of the invention to provide a harvester in which the cane is forced against the topping blade with sufficient force to ensure good topping.

It is a further object of the invention to provide a harvester which will efficiently selectively top the cane.

It is a still further object of the invention to provide a harvester having the above characteristics which is rugged and cheap to manufacture.

With these and other objects in view the invention generally comprises a truck designed to move along the cane rows. The truck carries a stripping and topping mechanism, adjacent its front end, means for cutting the cane adjacent the ground, and means for conveying the cut cane to a hopper at the back end of the truck. The cutting and topping mechanism includes two spiral shaped strippers rotatably mounted in parallel spaced apart relation on the superstructure of the truck and extending in an upward and rearward direction from the front end thereof. The strippers are spaced apart to receive the cane therebetween and are adapted to rotate as the harvester moves along the cane rows whereby to remove the dried leaves or trash and to thin out and break the strong green leaf growth at the top of the cane while it is in a standing position. They are preferably toothed for aggressive stripping. Beneath the strippers I mount a top-cutting blade for removing the tops from the cane. This blade is offset from a vertical plane through the space between the strippers and has its longitudinal axis in substantially parallel spaced apart relation to the inclined vertical strippers.

I then provide means for forcing the cane towards the blade when it is released from the inclined strippers as the harvester moves along whereby to selectively top the cane after the strippers have removed the trash and thinned the green leaves.

Cutting knives are carried by the truck behind the topping mechanism for cutting the cane adjacent the ground. The cane thus cut is picked up by a conveyor and carried to a hopper at the back of the truck. The invention will be clearly understood after reference to the following detailed specification taken in conjunction with the drawings.

In the drawings:

Figure 3 is a rear view of the machine of Fig. 1.

Figure 4 is a section along the line 4—4 of Fig. 1, showing the machine engaging two canes of different lengths.

Figure 1:
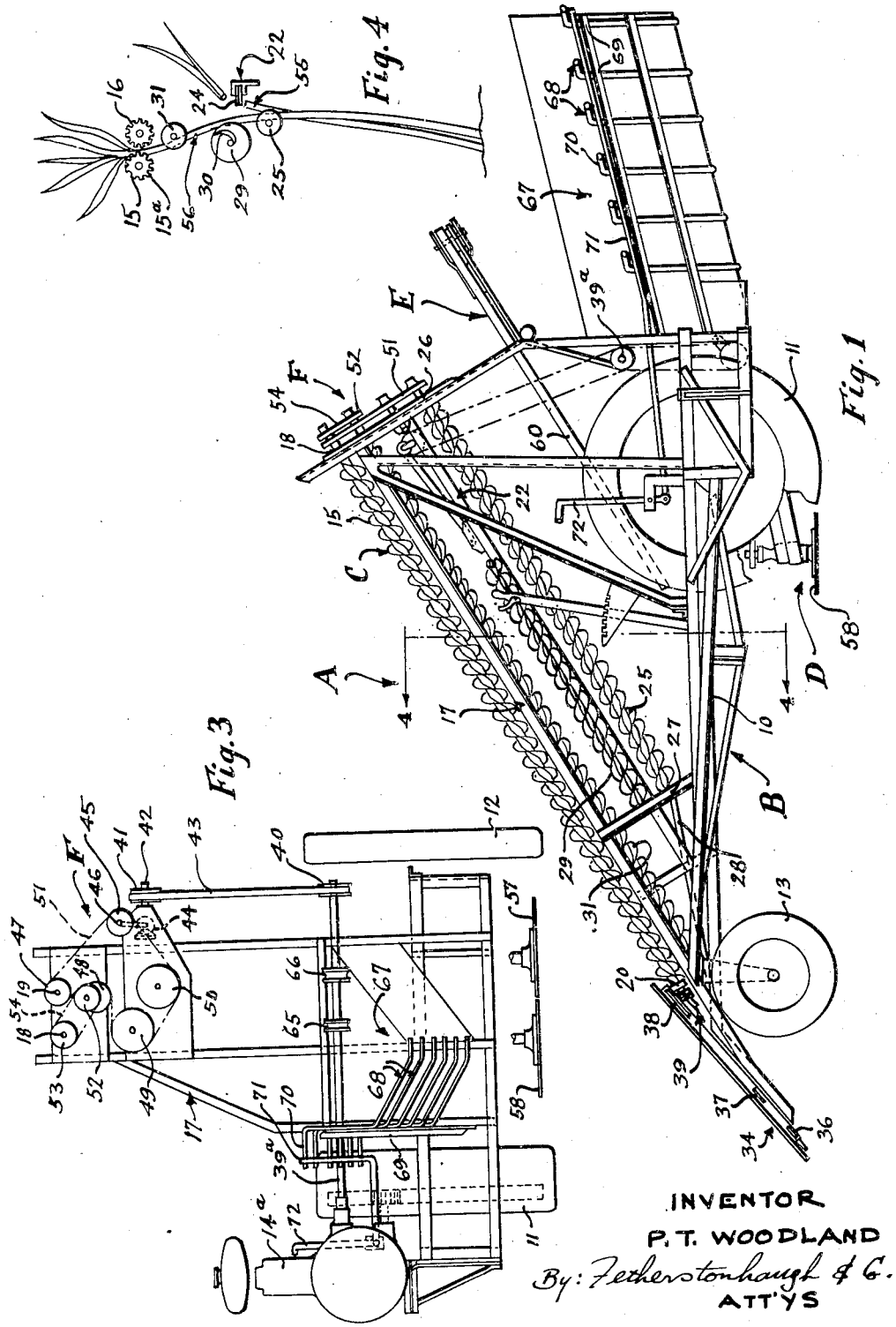
Figure 1 is a side elevation of my invention.

Referring to the drawings: A represents the harvester in general which comprises a truck generally indicated by the letter B adapted to carry a stripping and topping mechanism C, a cane cutting mechanism D, and a conveyor E for conveying the cut cane to a hopper at the back of the truck. These component parts will all be described in detail later.

The truck generally indicated by the letter B as shown in the drawings has a body 10, two back wheels 11 and 12, two front wheels 13 and 14, and a motor 14a adapted to drive it along the cane row. It may, however, be propelled in any suitable manner.

The stripping and topping mechanism generally indicated by the letter C includes two helical stripping members 15, 16 suitably journalled in spaced apart parallel relation in the superstructure 17 of the truck body 10 as at 18, 19, 20, 21. These strippers slope upwardly and backwardly from the front end of the truck body 10 and are designed to rotate as the truck moves along.

The strippers receive the standing cane therebetween and exert an upward pressure against the cane as they rotate, whereby to remove the dried leaves or trash and to break up the strong green leaves on the cane and to draw the cane into the harvester as it moves along. Some of the green leaf growth on the cane is removed by the strippers while some is only broken whereby to deprive it of its resilient properties. The spiral strippers are preferably toothed along their edges as indicated at 15a so as to exert a more vigorous stripping and leaf breaking action on the cane. The means for rotating these members is generally indicated by the letter F and will be described fully later since the same drive means is used to drive other parts of the trashing and topping mechanism.

A topping blade 22 is suitably mounted in the truck body 10 beneath the inclined strippers. This blade 22 is offset from a vertical plane extending through the space between the strippers 15 and 16 as seen best in Figure 6 and has its principal axis in substantially parallel spaced apart relation to the axis of the strippers 15 and 16 as seen best in Figure 1. The blade is preferably of the class having two tooth-like cutting members, one of which is rigidly mounted on the truck body 10, the other of which 24 is designed to reciprocate along its longitudinal axis and over the rigid cutting member to co-act therewith in a scissor-like manner. This is a known type of blade extensively used on farm mowers and the like and is not here shown in detail.

Beneath the topping blade 22 I mount a deflector member 25 designed to deflect the cane engaged by the strippers 15, 16 towards the topping blade. The deflector 25 in the form of the invention shown comprises a spiral shaped member, suitably journalled in the truck body 10 as at 26 and 27, in substantially parallel spaced apart relation to the cutting blade 22. It is adapted to rotate as the harvester moves along to frictionally engage the cane stalk whereby to form an auxiliary trash removing means to the strippers 15 and 16. As will be noted from Figure 4 of the drawings, the deflector 26 is offset from a vertical plane extending through the spaced apart strippers 15 and 16. I, therefore, provide a means for diverting the cane engaged by the strippers 15, 16 around the deflector member. In the embodiment shown this includes a rigid bar 28, extending from a point under the front end of stripper 15, across a vertical plane through the space between the strippers 15 and 16 to the deflector 25. It will be apparent that cane engaged between the strippers 15 and 16 will be diverted by this bar around the deflector 25.

As the harvester moves along the cane row, the cane is engaged in a standing position by the strippers 15 and 16 and bent around the deflector 25. The spiral shaped scrapers 15 and 16 draw the standing cane back into the machine as the machine moves along, so that the cane is always substantially in a vertical position when engaged by the strippers. As the harvester moves along, it will be apparent that the standing cane will disengage from the upwardly sloping strippers 15, and 16. When they so become disengaged from the strippers the trash has been removed from the stalks and the green leaves have been thinned and broken. It is further necessary, however, to remove the top portion of the cane or to "top" it. To do this, I provide a flicking mechanism mounted in the frame 10 beneath the strippers 15, 16 which is adapted to flick the cane against the blade 22 when it is released from the sloping strippers 15, 16. In the embodiment shown in Figures 1, 2 and 3 of the drawings, this flicking mechanism comprises a member 29 rotatably mounted in the truck body 10 in substantially parallel spaced apart relation to the blade, and adapted to carry springs 30 designed to bear against the cane and urge it towards the blade.

Other forms of flicking means, of course, are possible. For example, it would be possible to use a bar carrying stationary spring means adapted to bear against the cane.

As mentioned above the strippers 15 and 16 either break or remove the green leaf growth on the cane. This operation is very important to the satisfactory operation of my harvester. It will be apparent that if resilient unbroken green leaves are permitted to bear against the deflector at the time the cane is released, a considerable part of the resilient force due to the bending of the cane which tends to urge the cane towards the knives on release will be lost. When the green leaves are removed or broken however, the cane will bear directly on the deflector and the resilient force of the bent cane acts to urge the cane towards the cutting knives.

Beneath the strippers 15 and 16 I preferably mount an auxiliary stripper which comprises a spiral member 31 suitably journalled in the truck body 10. This member is adapted to rotate as the harvester moves along and to engage the cane whereby to help the strippers 15 and 16 to remove the trash.

In front of the strippers 15, 16 I preferably employ two gathering chains 33, 34 adapted to guide the cane between the strippers 15 and 16. These chains have pointed fingers 35 designed to grip the cane as the chains rotate around pulleys 36, 37, 38 and draw it into the harvester. These pulleys are suitably geared to the front end of the rotating strippers 15, 16 as indicated at 39, whereby they are caused to rotate.

The strippers 15, 16, deflector 25, flicker member 29, auxiliary stripper 31 are all connected to the drive shaft of the motor 14a to cause them to rotate as the harvester moves along the cane row. The connection shown in the drawings includes a shaft 39a suitably journalled in the truck body 10, driven by the motor 14a. The shaft 39a has a pulley 40 mounted thereon which is adapted to drive a pulley 41 on a suitably journalled shaft 42 by means of a belt 43. Rotational power is taken from the shaft 42 by the bevel gear assembly 44 to supply power to the power pulley 45 (see Fig. 3), on shaft 46 which is journalled at the top end of the truck superstructure 17. The power pulley 45 drives pulleys 47, 48, 49 and 50 (see Fig. 3) by means of a belt drive 51. These pulleys drive the shafts of the stripper 16, auxiliary stripper 31, flicker member 29 and deflector 25 respectively. The shaft of the auxiliary stripper 31 also carries a pulley 52 which is designed to rotate pulley 53 on the shaft of stripper 15 by means of the belt 54 whereby to cause it to rotate.

The operation of the trashing and topping mechanism thus far as carried by the harvester truck is this: The truck moves along the cane row and the gathering members 33 and 34 guide the standing cane between the inclined stripper members 15 and 16. As these members rotate they exert an upward force on the standing cane to remove the trash. While the trash is thus being removed the cane is bent from a vertical position by the deflector member 25 and bar 28. As the harvester moves along, the standing cane will become disengaged from the upwardly sloping strippers 15 and 16, at which time the flicker member 29 will deflect the bent cane towards the inclined blade 22 to cut the top of the cane off. As explained above the strippers and knife 22 are inclined, so that each cane is stripped of its trash and then topped.

The shorter canes are released and topped near the front of the machine while the longer ones are released and topped farther back in the machine. The topping blade is in substantially parallel spaced apart relation to the strippers so that all canes whether short or tall are topped the same distance from their tops.

Figure 2:
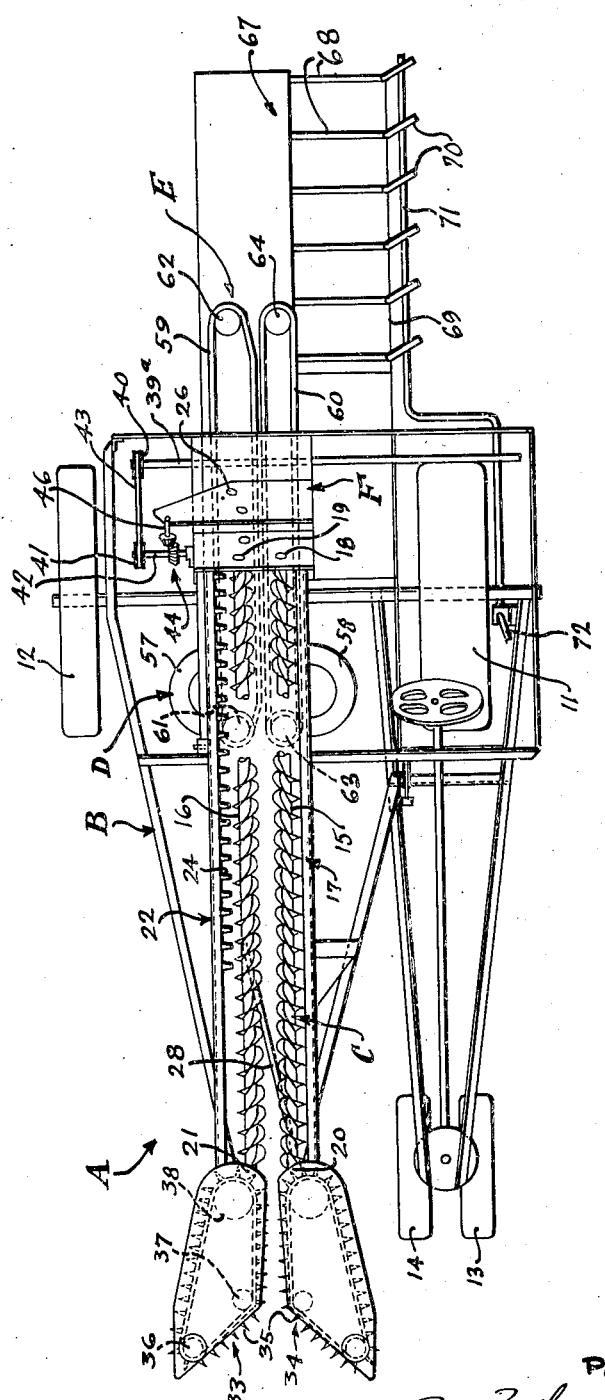
Figure 2 is a plan view of Fig. 1.

Figure 4 shows two canes of various length engaged by the harvester along section 4—4 of Figure 1. Cane 55 is a short one and has been released by the stripper 31 and has been flicked against the topping blade 22. Cane 56 is a longer one. It is still held between the strippers and will be released as the harvester advances and the height of the inclined strippers rises above it.

Behind the trashing and topping mechanism the truck carries a cane cutting mechanism generally indicated by the letter D which is designed to cut the trashed and topped cane close to the ground. The cutting mechanism includes two circular cutting blades 57, 58 suitably journalled in the body 10 of the truck. The blades 57 and 58 are belt driven from pulleys (not shown) powered from the motor 14a, whereby they are caused to rotate and coact with each other to cut the cane. Cutters of this general class were described in my former United States Patent No. 1,365,213.

As the cane is being cut it is engaged between two moving conveyer belts 59, 60. These belts rotate on pulleys 61, 62, 63 and 64 which are in turn belt driven from pulleys 65, 66 on power shaft 39, as the truck moves along. The rotating belts carry the cane towards the back of the truck and deposit it in the hopper 67 as it is cut by the blades.

The hopper 67 has a V-shaped bottom part of which is formed by the spaced apart bars 68. These bars are each journalled in the truck frame 10 as at 69 and have an actuating projection 70. The actuating portions 70 are all suitably connected by a common bar 71 or any other suitable means to a control lever 72 on the harvester, so that by operating the control lever each of the bars will turn in its mounting to cause the bars to swing from the bottom of the hopper and dump the contents thereof.

From the above it will be apparent that I have disclosed a harvester which can efficiently strip, selectively top, cut, and gather cane. The machine is rugged, as all farm machinery should be, and compared to machines of the same class of the prior art it is cheap to manufacture. Changes and modifications in the form of the invention described will be apparent to those skilled in the art. It is therefore intended that the invention should not be limited to the form of the invention described except for the limitations expressed by the following claims.

What I claim as my invention is:

1. In a cane harvester of the class having an inclined topping blade; stripping means extending in parallel spaced apart relation to, and above said above-mentioned blade designed to engage cane and remove the entangling top growth thereon, and actuating means for actuating said cane against said blade including two deflector members each adapted to extend the length of said above mentioned blade in parallel spaced apart relation thereto, one of said deflectors being mounted above the level of said blade the other being mounted beneath the level of said blade, said latter mentioned deflector being mounted closer to said topping blade in a horizontal direction than said first mentioned deflector, and means for causing cane to pass around said latter mentioned deflector on the side adjacent said blade and around said first mentioned deflector on the side opposite said blade to flex said cane whereby cane engaging with said deflectors is actuated against said blade after it is released from said strippers and from said first mentioned deflector selectively to top it.

2. In a cane harvester of the class having an inclined topping blade as claimed in claim 1 in which said first mentioned deflector member comprises a rotatably mounted spiral member and has means in connection therewith for rotating said latter mentioned spiral as said harvester is impelled along the ground.

3. In a cane harvester of the class having an inclined topping blade as claimed in claim 1 in which said actuating means for actuating cane against said blade further includes a shaft adapted to extend the length of said deflector members, means for mounting said shaft member in parallel spaced apart relation to said deflector members, spring means carried by said shaft adapted to positively urge cane engaged by said deflector members against said blade.

4. In a cane harvester of the class having an inclined topping blade as claimed in claim 2 in which said actuating means for actuating cane against said blade further includes a shaft adapted to extend the length of said deflector members, means for rotatably mounting said shaft member in parallel spaced apart relation to said deflector members, spring means carried by said shaft adapted to positively urge cane engaged by said deflector members against said blade.

PERCY TYLER WOODLAND.

REFERENCES CITED

The following references are of record in the file of this patent:

UNITED STATES PATENTS

| Number | Name | Date |
| --- | --- | --- |
| 1,022,313 | Gerdes | Apr. 2, 1912 |
| 1,204,536 | Bachtel | Nov. 14, 1916 |
| 1,365,213 | Woodland | Jan. 11, 1921 |
| 1,648,313 | Luce | Nov. 8, 1927 |
| 1,703,721 | Butman, Jr. | Feb. 26, 1929 |
| 2,096,588 | King | Oct. 19, 1937 |
| 2,281,904 | Wurtele | May 5, 1942 |

FOREIGN PATENTS

| Number | Country | Date |
| --- | --- | --- |
| 364,248 | Germany | Jan. 1, 1921 |